7 Sheets—Sheet 4.
W. L. MARSHALL.
AUTOMATIC CANAL-LOCKS.
No. 193,885. Patented Aug. 7, 1877.
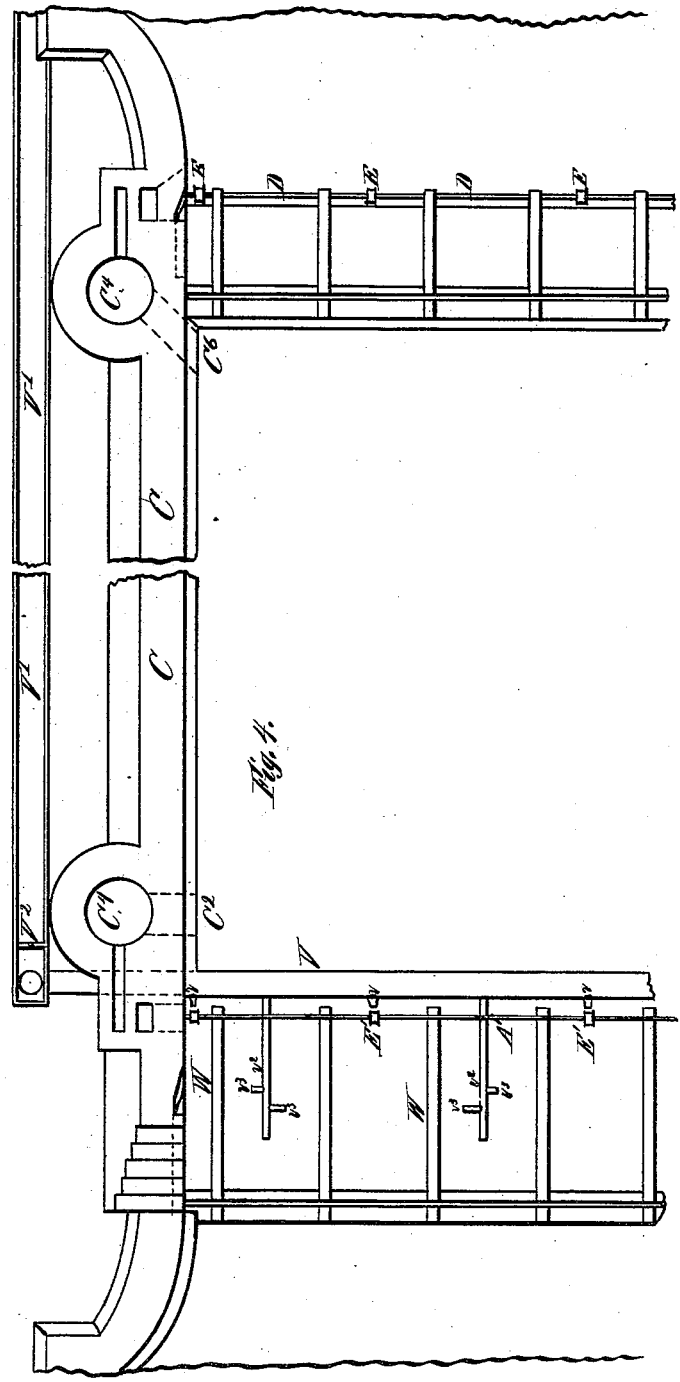
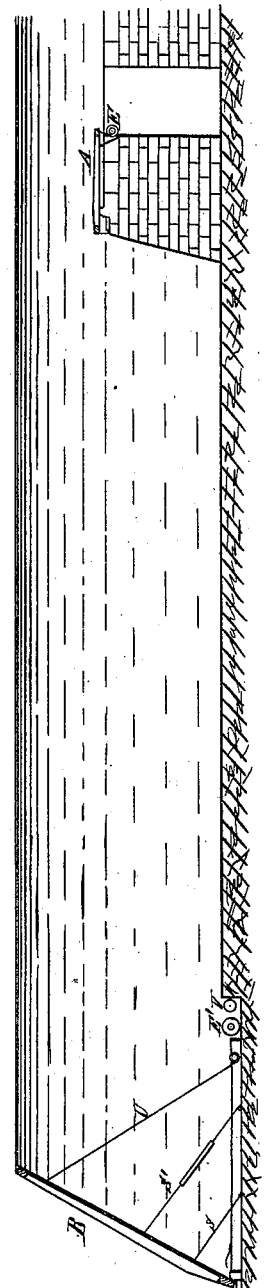
Attest:
Chas. H. Searle.
Clarence E. Curtis.
Wm. L. Marshall,
1st Lieut. U.S. Engineers,
Inventor:
By North Osgood
Attorney.

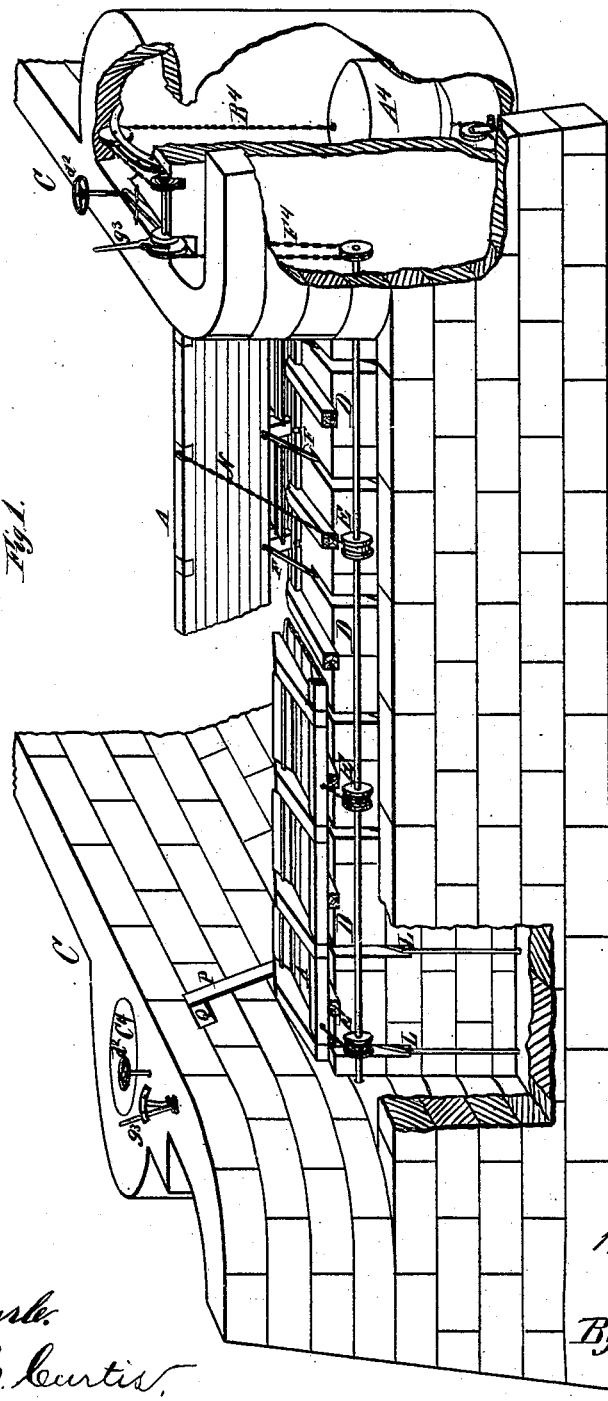

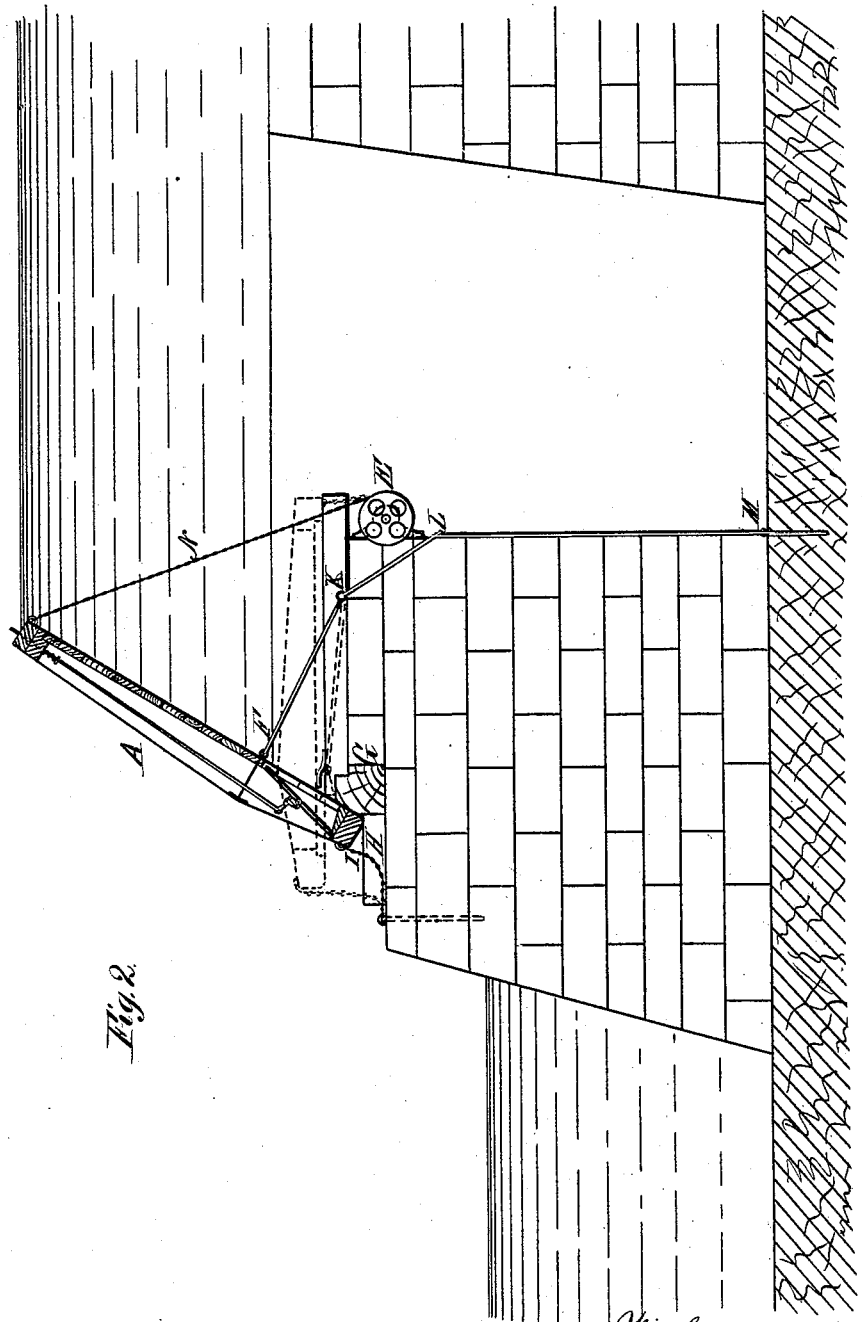

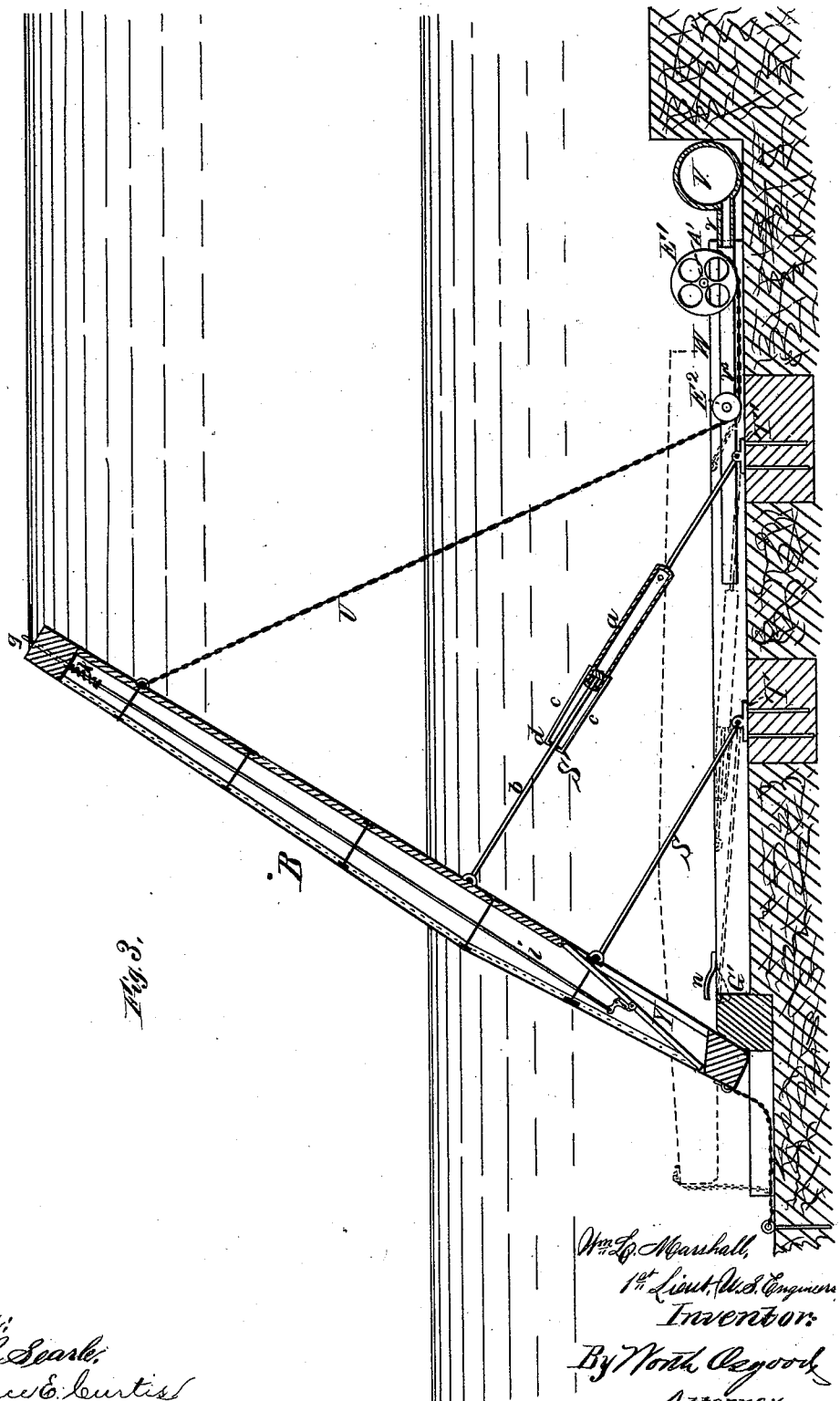

7 Sheets—Sheet 5.
W. L. MARSHALL.
AUTOMATIC CANAL-LOCKS.
No. 193,885. Patented Aug. 7, 1877.
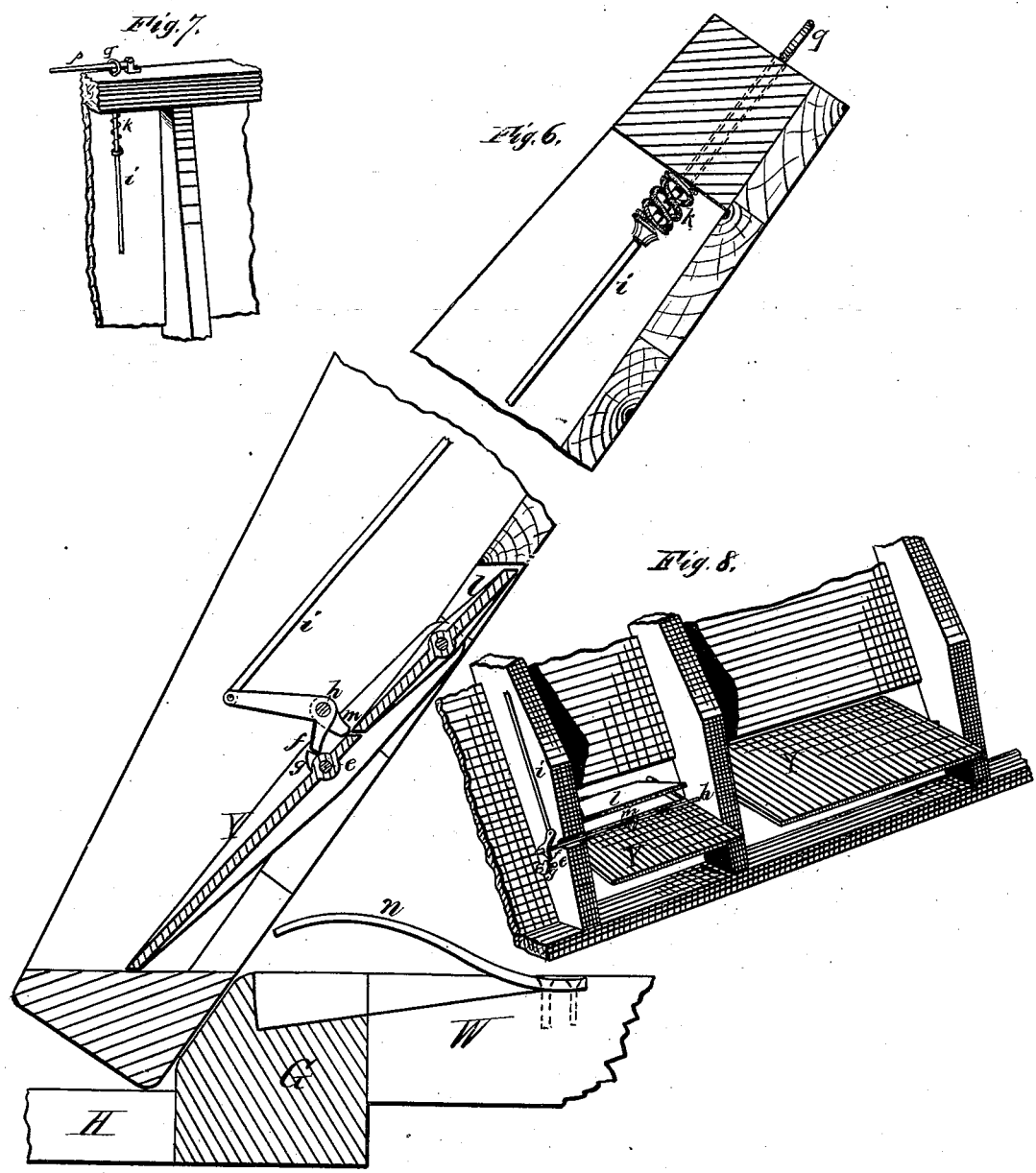

7 Sheets—Sheet 6.
W. L. MARSHALL.
AUTOMATIC CANAL-LOCKS.
No. 193,885. Patented Aug. 7, 1877.
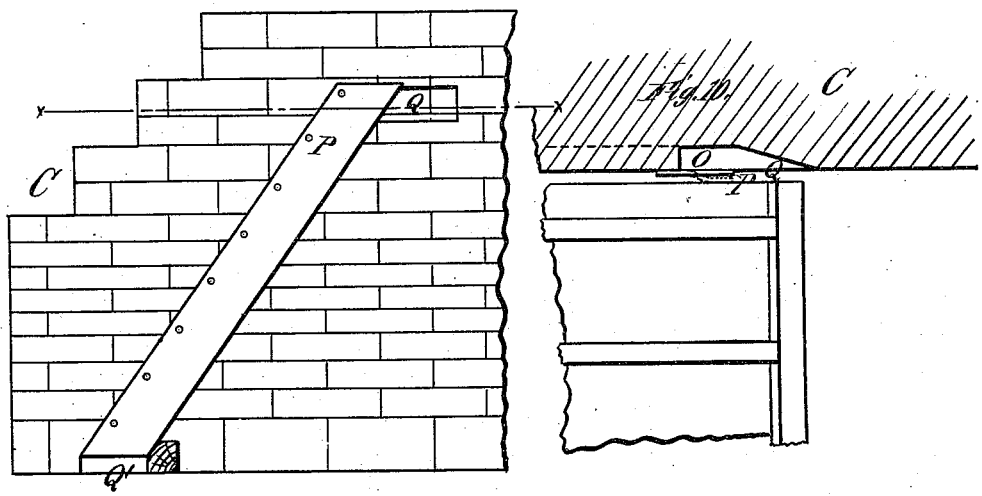
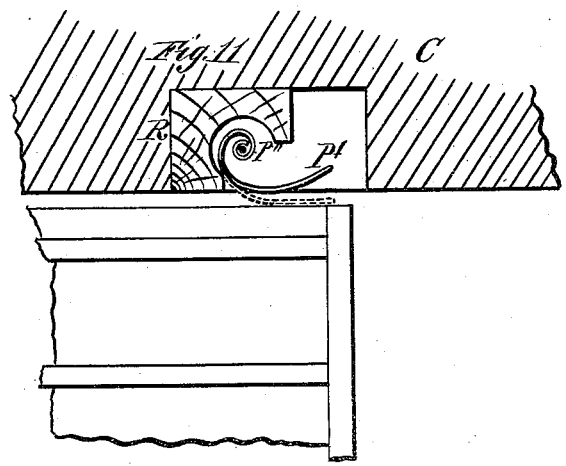
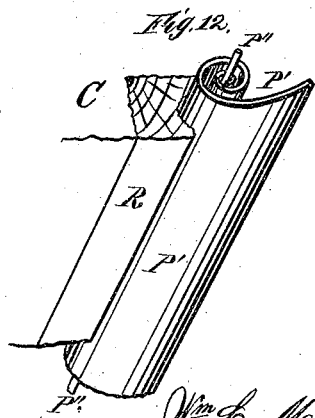
Attest:
Chas. R. Searle.
Clarence E. Curtis.
Wm. L. Marshall,
1st Lieut. U.S. Engineers,
Inventor:
By Worth Osgood,
Attorney.

7 Sheets—Sheet 7.
W. L. MARSHALL.
AUTOMATIC CANAL-LOCKS.
No. 193,885.　　　　　Patented Aug. 7, 1877.
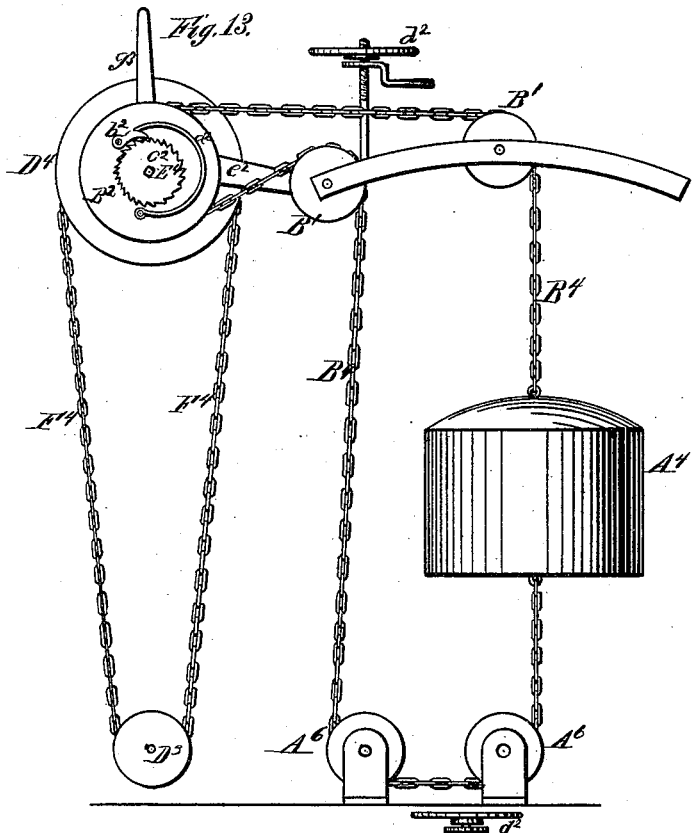
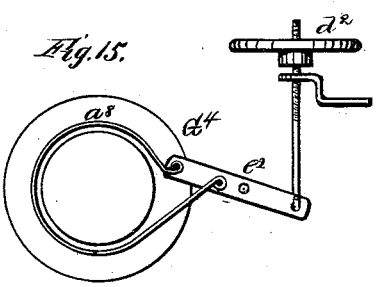
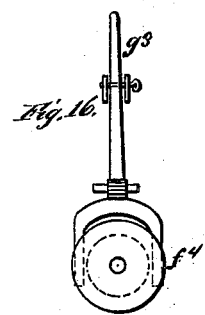
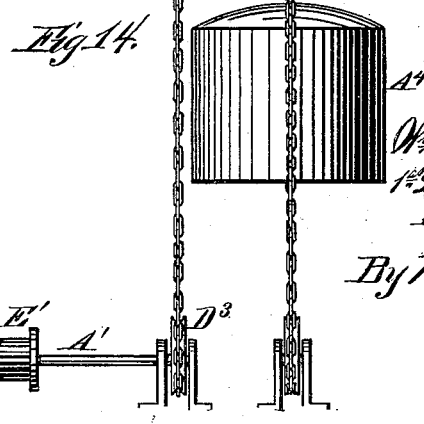
Attest:
Chas. R. Searle.
Clarence E. Curtis.
Wm. L. Marshall,
1st Lieut. U.S. Engineers,
Inventor:
By Worth Osgood,
Attorney.

UNITED STATES PATENT OFFICE.

WILLIAM L. MARSHALL, OF UNITED STATES ARMY.

IMPROVEMENT IN AUTOMATIC CANAL-LOCKS.

Specification forming part of Letters Patent No. 193,885, dated August 7, 1877; application filed July 2, 1877.

*To all whom it may concern:*

Be it known that I, WILLIAM L. MARSHALL, first lieutenant of engineers in the United States Army, at present stationed at Rome, in the county of Floyd and State of Georgia, have invented certain new and useful Improvements in Automatic Canal-Locks, of which the following is a full, clear, and exact description, reference being had to the accompanying drawings, and to the letters of reference marked thereon.

Figure 1 is a perspective view of the upper gateway of my improved canal-lock, exhibiting at the right-hand portion one-half of the gate in an elevated position, and at the left hand the other half as having been dragged down to its lowermost position. This figure also illustrates the location and arrangement of the buoy-well and operating mechanism, portions of the walls being broken away to facilitate the representation. Fig. 2 is a sectional elevation of the upper gate, and Fig. 3 a similar view of the lower gate, both figures representing the gates as being elevated. Fig. 4 is a plan view of one side of the lock, a portion of the same being broken out. Fig. 5 is a sectional elevation of the lock, upon a considerably smaller scale than Fig. 4, representing the lower gate as elevated or closed, and the upper one as depressed or open. Fig. 6 is an enlarged sectional view of one of the gates, showing the location of the valves therein, the spring for closing and the rod for operating said valves; and Fig. 7 is a front elevation of a fragment of the upper portion of the gate, illustrating a simple form of lever, by means of which the valve-operating rod may be conveniently elevated. Fig. 8 is a perspective view of a portion of the gate, exhibiting the valves as they appear when opened. Fig. 9 is an elevation of the side wall of the lock, showing the location and arrangement of the spring employed for closing the joint between said wall and the gate when elevated; and Fig. 10 is a horizontal section through the line *x x* of Fig. 9. Fig. 11 is a horizontal section of a modified form of joint-closer, and Fig. 12 a perspective view of a fragment thereof. Fig. 13 is a side elevation, and Fig. 14 a front view, of the gate-operating mechanism, illustrating a simple method of connecting the same with the maneuvering-axle. Fig. 15 is a detached view of the friction-clamp employed to fix the operating mechanism or to govern its motion as desired. Fig. 16 is a side view of the shifting-lever and its connected block, by means of which the friction-clamp is thrown in or out of gear with the operating mechanism.

Like letters in all the figures refer to corresponding parts.

The object of my invention is to simplify and improve the construction of the canal-lock and its gates, whereby the former shall be relieved of that outward thrust common to the ordinary form, which necessitates the construction or addition of expensive buttresses and hollow quoins, and the latter shall be capable of being easily maneuvered, both in the opening and closing movement, and less liable to get out of repair or to be injured by passing vessels; to provide a simple and efficient means of operating the gates through the medium of the buoyant effort of the water in the canal; to furnish the lock with means of automatically keeping the bed thereof and the operating mechanism adjacent thereto clear of sediment; and, specially, to devise a form of gate applicable to very wide locks, such as are used to close the navigable passes of large rivers, and to admit the passage of fleets of barges at a single lockage; to accomplish all of which the invention consists in certain peculiarities of construction, arrangements, and assemblages of parts, and the application of certain principles, all of which will be hereinafter first fully described, and then pointed out in the claims.

The gates may be made of iron or of wood, as most desired, and in all cases their specific gravity should be considerably less than that of the water displaced by them when immersed in the canal. Iron is preferable, and, if necessary, water-tight compartments may be placed near the top between the cross-beams, for the purpose of causing the gates to be elevated by their own buoyancy.

A is the upper gate, shown as made of wood; B, the lower gate, of iron; and C C, the lock-walls, usually of stone. Both gates extend from wall to wall, and each is hinged near to, but below, the center of pressure of the water upon it. The gate A is mounted upon a straight wall corresponding to the stone miter-sills of large locks, having the usual silt-basin and breast-wall in front; and it is shown in Fig. 2 as retaining the upper level, its lowered position being therein indicated by dotted lines. D is a continuous rod of iron, upon which are mounted the drums E E, &c., for working the gate. F F are iron rods attached at suitable intervals to the gate A, at a distance below the center of pressure dependent upon the pressure it is desired to bring upon the sill G when the gate is raised. The sill G, of large timber, extends the length of the miter-wall, and is bolted to it, as well as to sleepers under the gate, and to slide-bars H in rear of said sill. These latter timbers prevent the gate striking against the stone, and also allow room for sediment to deposit without interfering with the gate or the working of it. At the lower edge of the gate short chains I are attached at suitable intervals, and these are also bolted to the wall. They are intended both to prevent the gate from rising above its proper position when closed, and also to keep the gate from jumping over the sill G. The rods F are hinged, as at K, and the bar L, which forms a part of this hinge, is bent and continued to the point M, where it is firmly bolted or anchored to the foundation to avoid overturning the miter-wall. The gate being of less specific gravity than the water, as previously explained, it will rise to its elevated or closed position when the chains N N are unwound, or when it is desired to empty the lock-chamber. The raising or lowering is to be accomplished only when the water is at the same level on both sides of the gate, and but little force is, therefore, necessary beyond that required to overcome friction and the other resistances of the machine itself. When raised a head of one inch of water will maintain it in position, and as the water in the lock-chamber falls the heel of the gate will be pressed hard against the sill and make an absolutely water-tight joint at that point. The ends of the gate are allowed to move perfectly free from the side walls, and the interval is closed by the joint-closer when the water-pressure is greater upon the front than upon the rear of the gate, as will occur when the water begins to sink in the lock-chamber or in the lower reach.

The joint-closer is represented in detail in Figs. 9 and 10, wherein O is a recess or cavity, an inch or more in depth, cut into the side wall at an inclination (about sixty degrees with the horizon) and position to correspond with the elevated position of the gate, and P is a thin plate of steel or other elastic medium bolted along its rear edge to the wall and covering the cavity O. At the upper portion of the cavity, and on its forward side, is a mouth, Q, always open, and affording a free passage for the water to said cavity as soon as the gate rises high enough to expose said mouth. When the gate is raised the water enters the cavity O, and, in attempting to gain the lower level, will force the spring P outwardly from the wall, and will press it (the spring) against the adjacent edge of the gate, as indicated by the dotted lines, Fig. 10. As long as the water in the lock-chamber is lower than in the upper reach, or as long as that in the lower reach is lower than that in the lock-chamber, the spring will remain pressed outward, but will return to its straight position and be out of the way of passing vessels at the proper time or when the gate is lowered. A nearly completely water-tight gate is thus secured, at the same time leaving the utmost freedom of motion to the gate. No outward thrust is thrown upon the lock-walls, and the power required for maneuvering the gate is reduced to a minimum. Of course, it will be understood that one of these spring-closers is to be applied at each end of each gate.

A modified form of spring is exhibited in Figs. 11 and 12, wherein P' is a spirally-curved spring, loosely swung upon the inclined rod P''. It is let into the wall in such position that its own weight will carry it back out of the way when the water-pressure is withdrawn. When the gate is elevated this spring will press against the curved wooden cushion R (also let into the wall) and against the edge of the gate, thereby forming the desired water-tight joint. In either form shown the water which may remain between the spring and the wall after the gate is lowered will gradually find its way out at bottom through a passage provided for that purpose, as at Q', Fig. 9; and this flow of water at bottom will prevent the recess behind the spring from being obstructed by sediment and deposits. It is not necessary for the successful operation of the spring-closer that the mouth Q should be located as described, for the same general effect will be produced if the mouth be extended downwardly the entire length of the spring.

Numerous other modified forms of the joint-closer may be readily contrived, it being only necessary to bring the same within the spirit of the invention that it shall be automatically pressed against the edge of the gate when elevated, similiarly returned to its normal position when the gate is depressed, and leave the face of the wall practically plain for the passage of vessels.

In the case of the lower gate, a rod, S, is attached at about one-half the depth of the lower level, and a second tie or rod, S', is placed, as in the upper gate, below the center of pressure on the entire surface of the gate, a distance dependent upon the pressure desired upon the sill $G^1$. Both these ties are hinged to the gate and to saddles T T', which are firmly and securely bolted to the foundation. If this foundation be not rock, masonry anchors must be built. As the water in the lock-chamber rises the center of pressure changes between the lower and upper ties S and S'. The gate is thrown violently into position, and if not checked the fastenings would be broken. The upper tie is therefore made in the shape shown in Fig. 3, wherein $a$ is a cylinder, which receives the piston $b$, and which is provided with ports at top and bottom, forming a water-brake, well known and used for similar purposes, causing the gate to gradually attain its final position. The piston-rod, which forms a portion of the tie S', being of considerable length, would be liable to become bent or kinked during the downward movement of the gate; and to prevent this the collar $d$ is made to surround said rod, and is attached to or braced from the cylinder in any convenient way, preferably by means of the braces $c\ c$. As soon as the gate has attained its final position—i. e., making an angle between sixty degrees and ninety degrees with the horizon—the lower tie S is relieved of strain, which is thrown upon the upper tie S' and upon the sill $G^1$. This is effected by making the hinge at T loose and free.

The same arrangements are made at the heel of this gate as in the upper gate. It is intended that the buoyancy of the gate shall cause it to rise when released until the upper edge projects several inches above the surface at the lower level, and that when the upper culverts or valves are opened to fill the lock-chamber the few inches head of water exerted over the entire gate-surface will throw it up.

While moving up slowly under the action of the water-brakes, a narrow opening will be left between the miter-sill and the gate, through which opening water will flow and keep the space at the rear of the miter-sill free from sediment. This will continue for so short a time that the leakage may be regarded as insignificant; and it may be advisable to leave small holes between the gate and miter-sill, or cut through the sill, to direct small streams of water into the aforementioned space.

In Fig. 3 one of the maneuvering-drums $E^1$ and its axle $A^1$ are shown in elevation and section. A change of direction for the chain U may be effected, if necessary, by the sheave $E^2$, to prevent cutting a recess below the gate to accommodate the drums.

To prevent the space below the gate which is occupied by the tie-rods and maneuvering axle and drums from becoming filled and clogged with sediment, a pipe, V, of suitable dimensions is carried along the maneuvering-axle, and from this project smaller pipes of varying lengths, laid along or between the sleepers W. One of these, as $v$, terminates in front of each drum, and the others, as $v^2$, are carried farther along, throwing out jets at suitable intervals, as indicated at $v^3$ in the plan view. The pipe V communicates with a suitable channel, $V^1$, leading from the upper level, either directly or through the waste-weir, and this channel or conduit is governed by a gate or valve, $V^2$. Whenever the deposit becomes too great the gate or valve $V^2$ is opened, and the rush of water will stir up the sediment, which will pass off through the valves in the bottom of the gate into the lower reach. All the waste-water of the canal may be directed through this pipe, and it may also be used in filling the canal-lock; hence no extra water will be needed for keeping the drums, &c., clear.

Both gates are provided with valves; and since the arrangement and operation is the same in each case, a description of one set will suffice. The valves are placed in the gates themselves longitudinally, and may have any position, between the constant water-surface in the canal and the bottom. They are represented as at the bottom of the gate, and are preferably of cast-iron, and flanged for strength, substantially as indicated at Figs. 6 and 8. Y Y, &c., represent the valves mounted upon the horizontal axis $e$, which is continuous throughout the system. This axis is placed near the center of pressure of the valves, but far enough below it to give sufficient preponderance of pressure above said axis to keep the valves shut when water-pressure is brought to bear upon them. They are locked, when in a closed position, by means of the dog $f$, which engages with the mutilated ratchet $g$ upon the projecting end of the axle $e$. The dog $f$ is secured to, and rotates with, a short horizontal bar, $h$, located in rear of the valve and a trifle above the axle $e$, and it (the dog) is held in contact with the ratchet by means of the rod $i$, governed by the spiral spring $k$ near the top of the gate.

A secondary valve, $l$, forms a part of one of the main valves Y, and is pivoted within it in such manner that its center of pressure shall be below its axis, so that the natural tendency of the water will be to throw this secondary valve open. It is held in a closed position by means of a small cam or latch, $m$, upon the rod $h$, which cam bears upon the lower edge of the valve $l$ when closed, but which is easily turned out of the way by elevating the rod $i$, thereby revolving the bar $h$, and disengaging the dog $f$ and ratchet $g$ at the same time.

From this arrangement it is apparent that if the gate be in an elevated position and water pressing upon its front side, and the bar $i$ be raised, the secondary valve will be immediately thrown open, and thus the preponderance of pressure upon the valve system be thrown from above its main axis to a point below the same. This will cause the several valves Y Y, &c., to be thrown open; and by this simple operation a valve-surface of one hundred or more square feet may be easily controlled by merely throwing open or operating one of two or three square feet.

When the gate is lowered the top of the valve strikes against a spring, $n$, and the small valve is first closed by reason of its position; then the entire valve is closed and locked by the dog $f$, which is forced into place by the spring $k$; at the same time the cam $m$ is brought to bear against the lower edge of the small valve. This locking of the large valves Y Y is necessary only for the following reasons: It has been said that the preponderance of pressure is upon the upper half of said valves. Therefore, when the gate is being raised, if the valves were not locked the inertia of the water would bring an excess of pressure upon the upper surface, and the valve would thereby be thrown open again, and in the case of the lower gate it would be impracticable to fill the lock-chamber. When the valves are locked, however, they are retained nearly shut, and the water-pressure, when the gate is up, will force them tightly against the beveled surfaces prepared for them.

To facilitate the lifting of rod $i$ against the action of spring $k$, a simple lever, $p$, Fig. 7, may be inserted through the ring $q$, which projects above the top of the gate, and this lever may be withdrawn, if necessary, before the gate sinks. This arrangement of valves within the gates enables me to dispense with the expensive culverts or the cumbersome and unwieldy valves heretofore employed, and it also enables me to fill or empty the lock by the expenditure of very little power in opening or closing the valves.

The valve system may extend the full length of the gate, if desired, or several sets of valves may be placed one above the other, giving an increased area for the flow of water.

In maneuvering the gates when the lift of the lock is considerable, I propose to use the buoyant effort of the water as a power, and this is obtained through the medium of buoys, which are raised with the water-surface, and if not retained would again sink with it. From the arrangement of the gates, as already described, but little power is obviously required to operate them, it being only necessary to drag them under water a distance equal to the constant depth of water in the canal instead of through a wide horizontal arc, as in the miter system.

The lower gate, then, is operated substantially as follows: At one or both ends of the gate a suitable buoy-well, $C^4$, is excavated or built in the side walls C C, suitable channels being left for locating the chains and drums. The buoy $A^4$ is part of an endless chain, $B^4$, which passes about the pulleys $A^6$ $A^6$ $B^1$ $B^1$, and about the driving-wheel $B^2$. A channel leads from some convenient part of the lock-chamber to the buoy-well $C^4$ and connects the two, as at $C^2$, Fig. 4. The buoy $A^4$ is filled with water, or nearly filled, so that it will just float, and it is carried in the well as high as the upper level, where it is held in elevated position by the pressure of the water exerted through the maneuvering-chains until the water recedes. Its weight is then brought into play to turn the driving-wheel $B^2$, around which the chain $B^4$ is wound, Figs. 13 and 14. The driving-wheel is loosely mounted upon its shaft, and carries a spring and pawl, $a^2$ and $b^2$. When the buoy is ascending, the wheel $B^2$ is allowed to revolve without disturbing its shaft; but as soon as the descending movement commences the pawl engages with the ratchet-wheel $c^2$, and causes the shaft to which said ratchet is keyed to revolve. This shaft $E^4$ carries the chain-pulley $D^4$, from which motion is communicated to the pulley $D^3$ through the endless chain $F^4$. From this latter pulley $D^3$ motion is communicated to the maneuvering-axle $D^1$, which carries the several chain-drums $E^1$. When the buoy is elevated it is prevented from descending too rapidly by means of the friction brake-wheel $G^4$, about which the strap $a^3$ is tightened by turning the hand-wheel $d^2$, thereby elevating the projecting end of lever $e^2$. This arrests the motion of the shaft $E^4$, with which the wheel $G^4$ is connected.

For maneuvering the upper gate the buoy is made air-tight and empty, and is caused to drag the gate under water in its ascending movement. To connect this buoy with the gate similar apparatus to that above described may be employed, it being only necessary to reverse the action of the pawl and ratchet, so that the driving-shaft shall be compelled to turn as the buoy ascends, and allowed to remain at rest as it descends, and then to connect the endless chain $F^4$ with the driving-wheel attached to the maneuvering-axle D. The lock is maneuvered, then, in this manner: Suppose the upper gate to be up, the buoys both at the bottom of their wells and the lock-chamber to be empty so far as to surface of lower level. When a boat approaches (supposed to be coming down from upper level) the maneuvering-axle is disconnected from the buoy by throwing the clutch-block out of gear by use of the lever $g^3$, and this lever is then keyed, so as to retain the clutch in that position. The lower gate is released, and its buoyancy causes it to rise until its top is above water. The valves in the upper gate are then thrown open, as previously described. The water fills the lock-chamber, and the lower gate is gradually pressed into its proper position as the water rises, and when the head of water is so far reduced as to make the buoyant effort of the upper buoy exerted upon the maneuvering-chains greater than the pressure upon the gate plus its buoyancy, the upper gate will be dragged down to its lowermost position, the movement being checked, if necessary, by the application of the friction-brake. The valves in upper gate will be closed in this movement by the spring previously described. The vessel then passes into the lock, after which the buoy is disconnected from the maneuvering axle and chains, and the upper gate thus allowed to rise into closed position by its own buoyancy. The valves of the lower gate are then thrown open, and the clutch brought into play to connect the buoy with the maneuvering-axle of the lower gate, so that the weight of its buoy will act to pull the said gate down, and when the pressure is so far reduced as that the weight of the buoy is equal to that component of the pressure exerted along the maneuvering-chains plus the buoyancy of the gate and its appendages, it will be dragged down to the position shown by dotted lines, Fig. 3, the valves being closed, as in the upper gate. In this condition or position of the system, to maneuver the lock it is only necessary to release the small valves when the gates are up, and to release the gates when they are down, which may be effected by one man.

The friction-brake is used or intended only to modify the motion of the gate when it is near its bed. The clutch, as shown, is connected with the friction-wheel by a pin sliding in a hole through said wheel, instead of directly to the driving-axle by means of a feather and slot, as is customary, and this arrangement is preferred, because the leverage in the latter case would in time injure the feather.

To elevate the gate the lever $g^3$ is used to withdraw the clutch-pin from the loose pulley $D^4$, which action disconnects the buoy from the maneuvering-chain, and allows the gate to float up and unwind the maneuvering-chains.

In a lock sixty feet wide and having a lift of ten feet, the pressure of the water upon the upper gate will be about seventy-five tons, and upon the lower one about two hundred and fifty tons, so that the buoys will be held suspended without moving the gates at all until the head of water pressing upon the gates is reduced to very little.

The habitual position of the buoy, then, is to be connected with the maneuvering-axle, the clutch being used only to disconnect the buoy for a long enough time to allow the gate to rise, and until a small head of water is formed sufficient to retain the buoy.

The lock is automatic, intelligence only with the exertion of very little power being required to direct and time the movements of its parts.

It is evident from the foregoing description that the gates can be maneuvered to advantage by buoys only in locks where the lift will allow sufficient movement in the buoys or weights used without so far increasing the capacity of the buoys as to use up too much water. In the case of small lift-locks, instead of buoys, an ordinary capstan and beveled gear may be connected with the maneuvering-axle, and the gates worked by outside power of any desirable character. In this event the lock loses its automatic character, so far as lowering of the gates is concerned.

The term "buoy" is herein applied indifferently to the device connected with the upper gate, as well as that connected to the lower one. While it is be understood that in the latter case only the weight of the device is employed in accomplishing the dragging down of the gate, the term "buoy" is applied to it simply because it is carried up to its working position by the buoyant effort of the water.

It is not intended to limit the scope of the invention to the precise machinery or arrangements herein shown. These features will be modified according to circumstances, often depending upon the location and character of the lock. The details shown and described are selected for the purpose of illustrating the principles of the invention, and are believed to be as simple and complete as will be ordinarily required.

One of the principle features of the gates, not hereinbefore alluded to, is the manner in which they are made to revolve.

It will be observed that in both gates they have a movable horizontal axis, by reason of which they are brought to their elevated or closed positions with far less shock and strain upon the foundation than would result from the employment of a fixed axis, as if they were simply hinged to their respective miter-sills.

The simplicity, relative cheapness, and automatic character of the lock will recommend it for use in preference to the ordinary styles.

Having thus fully described my invention, what I claim as new, and desire to secure by Letters Patent, is—

1. A lock-gate hinged near its center of pressure, substantially as described, so that in its upward and downward movement it shall revolve about a movable or shifting axis, for the purposes set forth.

2. In combination with a vertically-moving lock-gate, a double series of rods hinged thereto and to the foundation, one series being located above the other, substantially as shown and described.

3. In combination with a lock-gate, a double series of rods hinged thereto and to the foundation, the upper series being provided with a water-brake, the whole operating substantially as set forth.

4. In combination with a rod which forms a portion of the hinge of a lock-gate, a water-brake operating substantially as set forth, and carrying a guide to prevent kinking or binding of the piston-rod, as explained.

5. In combination with a lock-gate, a maneuvering-axle located parallel with the axis of said gate, at a point near the lowermost position thereof, the same being provided with drums to receive the maneuvering-chains, and adapted to receive motion from a power applied to said axle, substantially as set forth.

6. A sill or heurter constructed and arranged substantially as explained, and connected with sleepers in front and sliding bars in rear, for the purpose of preventing damage to the gate, the whole being combined as set forth.

7. In combination with a lock-gate which swings about a movable axis, the heel-chains, located at suitable intervals along the edge of said gate, and operating to prevent its jumping, substantially in the manner explained.

8. In combination with a lock-gate, a block-wall, recessed, as explained, for the purpose of affording access of water to the rear of the joint-closer, substantially as set forth.

9. In combination with a vertically-moving lock-gate, a joint-closer attached to the lock-walls, and made automatically adjustable, substantially as set forth.

10. In combination with a lock-gate hinged at or near its lower edge, an elastic joint-closer secured to the lock-wall, and adapted to close the joint between the gate and said wall, by abutting against the end of the gate when the latter is in an elevated position, in the manner and for the purposes shown and described.

11. In combination with a valve located in a lock-gate, a second or supplementary valve connected therewith, by the opening of which latter the center of pressure on the whole valve-surface is changed from one side of its axis to the other, substantially as explained.

12. In combination with a valve located in a lock-gate, a spring attached to some convenient portion of the lock, and adapted to close said valve when the gate is opened, for the purposes set forth.

13. In combination with a valve system in a lock gate, a locking contrivance adapted to secure said valve after it has been automatically closed, in the manner set forth.

14. In combination with a locking contrivance connected with a valve in a lock-gate, a rod projecting to the upper surface of said gate, and adapted to control the locking mechanism, substantially in the manner shown and described.

15. The herein-described lock-walls, recessed or provided with suitable wells to receive the operating-buoys, substantially as set forth.

16. In combination with the buoy-wells, a channel or passage leading thereto from the lock-chamber, for the purposes set forth.

17. The herein-described buoys, combined with the gate-operating mechanism, substantially as described, so that the gates may be lowered or dragged under water by means of the power derived from the buoyant effort of the water, substantially as explained.

18. In combination with the buoys or weights, which are elevated by the buoyant effort of the water, an endless chain operating to communicate motion to the maneuvering-axle, substantially as described.

19. In combination with a buoy or weight adapted to be elevated by the buoyant effort of the water, an endless chain operating to communicate motion, substantially as explained, and a friction clutch or clamp adapted to arrest the motion of said buoy, for the purposes set forth.

20. The combination of buoys or weights, the driving-chain, a maneuvering-axle located below the gate, and carrying the chain-drums, and a series of chains attached to said gate at suitable intervals, substantially as described.

21. In combination with the maneuvering-shaft of a lock-gate, a series of water-pipes, arranged to throw jets upon or under the chain-drums, for the purpose of keeping them clear of sediment, substantially as specified.

22. A series of water-pipes laid along the bottom of the lock-chamber, and adapted to keep the same clear of sediment, said series being connected or combined with a main pipe leading from a higher level, substantially as set forth.

23. In a canal-lock, a main pipe leading from the upper level or from the waste-weir, as explained, the same being provided with a gate or valve, and combined with a series of pipes in the lock-chamber, whereby the surplus water of the canal may be utilized for filling or clearing said lock-chamber, as set forth.

24. In a canal-lock, the combination of an upper and a lower gate, both being adapted to be elevated and depressed by the buoyant effort of the water, substantially as explained.

25. In a canal-lock, the combination of an upper and a lower gate, the former being connected with a buoy adapted to depress it during the ascending movement of said buoy, and the latter being connected with a weight adapted to depress it during the descending movement of said weight, substantially as specified.

In testimony that I claim the foregoing I have hereunto set my hand in the presence of two witnesses.

W. L. MARSHALL,
*First Lieut. U. S. Engineers.*

Witnesses:
T. M. GUISE,
M. DWINELL.